(12) United States Patent
Kim et al.

(10) Patent No.: US 8,644,856 B2
(45) Date of Patent: Feb. 4, 2014

(54) NETWORK-ASSISTED OPTIMIZATION OF LOCATION DETERMINATION

(75) Inventors: Byoung-Jo Kim, Morganville, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 449 days.

(21) Appl. No.: 12/637,477

(22) Filed: Dec. 14, 2009

(65) Prior Publication Data

US 2011/0143777 A1 Jun. 16, 2011

(51) Int. Cl.
*H04W 24/00* (2009.01)

(52) U.S. Cl.
USPC ..... 455/456.3; 455/411; 455/418; 455/456.1; 455/456.2; 455/63; 455/414.2

(58) Field of Classification Search
USPC ............ 455/411, 418, 414.2, 6, 456.1–456.3, 455/63
See application file for complete search history.

(56) References Cited

U.S. PATENT DOCUMENTS

| | | | |
|---|---|---|---|
| 6,141,570 A | 10/2000 | O'Neill et al. | |
| 6,716,101 B1 | 4/2004 | Meadows et al. | |
| 7,026,984 B1 | 4/2006 | Thandu et al. | |
| 7,319,757 B2 * | 1/2008 | Kumar | 380/247 |
| 7,940,172 B2 * | 5/2011 | Bell et al. | 340/539.13 |
| 8,103,291 B2 * | 1/2012 | Rippon et al. | 455/456.3 |
| 2003/0201931 A1 | 10/2003 | Durst et al. | |
| 2004/0037313 A1 | 2/2004 | Gulati et al. | |
| 2004/0111535 A1 | 6/2004 | Boucher et al. | |
| 2004/0176107 A1 * | 9/2004 | Chadha | 455/456.5 |
| 2005/0040953 A1 | 2/2005 | McDonald | |
| 2005/0113124 A1 | 5/2005 | Syrjarinne et al. | |
| 2008/0220755 A1 * | 9/2008 | Bushnell et al. | 455/417 |
| 2009/0192688 A1 * | 7/2009 | Padmanabhan et al. | 701/70 |
| 2010/0285817 A1 * | 11/2010 | Zhao et al. | 455/456.3 |
| 2011/0045801 A1 * | 2/2011 | Parker, II | 455/411 |

\* cited by examiner

*Primary Examiner* — Amancio Gonzalez
(74) *Attorney, Agent, or Firm* — Parks IP Law LLC; Jennifer P. Medlin, Esq.

(57) ABSTRACT

A mobile device that can use both data from a GPS or other GNSS receiver and signals from a wireless network to provide location based services based on the location of the mobile device is controlled at least partly by a locationing resource control module in the wireless network. The module provides network-assisted optimization of utilization of the GPS receiver and other resources by activating the GPS receiver and associated components when fine resolution location data is needed for provision of the location based services, and deactivating the GPS components when coarse resolution will suffice. The selective control of the GPS components is performed in the wireless network in response to receipt from the mobile device of location requisition data, conditions specifying what actions are to be performed by the mobile device, and current location data from the wireless network. The wireless network may also specify and prioritize at least some conditions.

19 Claims, 5 Drawing Sheets

NETWORK-ASSISTED OPTIMIZATION OF LOCATION DETERMINATION

TECHNICAL FIELD

The present invention generally relates to wireless communications, and more specifically, to optimizing utilization of resources for providing positioning and location-based services to mobile devices.

BACKGROUND

Geolocation and positioning technology, such as the satellite-based Global Positioning System (GPS), offer commercially attractive opportunities to provide any number of useful location-based services to users of cellular handsets and other mobile devices, such as turn-by-turn directions, mapping of nearby points of interest and landmarks, and targeted emergency assistance.

Accessing such technology can be taxing for a multipurpose mobile device that has less power to spare than a dedicated device such as a GPS receiver. In addition to traditional voice features, ancillary features such as email and other messaging applications, internet browsers, games, music, and geolocation applications consume processing resources in the mobile device and strain battery power. Furthermore, certain geolocation and positioning technologies also sap the resources of the communications network that serves the mobile devices.

For example, GPS signals shift in frequency due to the relative motion between a handset-based GPS receiver and the constantly moving GPS satellites. This Doppler frequency shift requires the GPS receiver to find the frequency of the signal before the GPS receiver can lock onto the signal and make a determination of location. To do so, the receiver may need to search the entire frequency range.

Many GPS equipped mobile devices also supplement GPS with adjuvant technologies such as Time of Arrival (TOA), Enhanced Cell Identification, and Assisted Global Positioning System (A-GPS). For example, A-GPS uses a combination of GPS satellites and cellular network base stations to more accurately and/or more rapidly pinpoint the location of a GPS receiver associated with a mobile device. The mobile device GPS receiver correlates an estimation of the mobile handset location as determined by a cell-sector to more accurately predict the GPS signal the handset will receive. With this assistance, the extent of the frequency search space is reduced and the time-to-first-fix (TIFF) of the signal is reduced from minutes to seconds. A-GPS handset receivers can also detect and demodulate signals that are weaker in magnitude than those required by a traditional GPS receiver.

Although these hybrid architectures can increase battery conservation capabilities of the mobile device, constantly querying the cellular network and/or GPS satellite network represents an ongoing drain of battery power in addition to a strain on communications networks.

Regardless of the technologies that are used, continuous location tracking is typically provided as long as the device is powered on and any location-based application is activated. Location data is continually fed to and output from each location-based application at the highest-resolution that the device and network can access. However, location data at such fine resolution is not continually used by or useful to the user. For example, most users of turn-by-turn navigation services are familiar with at least part of the selected route—often, the origination point of the trip is a user's home city. A user will program a navigation system at the start of the trip nonetheless, so that useful directions will be available when needed.

Continuous tracking of device location at fine resolutions consumes substantial battery power, sometimes to the extent that user behaviors are adapted to compensate. For example, to extend battery life, a user may manually deactivate location functionality of the mobile device when location information is not needed. It is easy to imagine that the user may then forget to reactivate the functionality when location is needed and have to wait for the system to boot up and acquire the data.

Therefore, there is a need in the art for an intelligent system that automatically optimizes utilization of mobile network and handset resources dedicated to providing geolocation and location-based services to mobile devices.

SUMMARY OF THE INVENTION

The identified need is solved with systems and methods for network-assisted optimization of continual location determination. Advantageously, locationing equipment that extensively uses resources in a mobile device is automatically deactivated when fine resolution location data is not needed, and network-based systems are utilized instead to provide locationing at resolutions that are sufficient to provide the level of service that is desired or necessary and to allow efficient reactivation of device-level locationing equipment.

As used in this context, the term equipment refers to hardware resources that utilize, control, or are controlled by software and signaling resources. The term locationing refers to determining or tracking the location of a mobile device. The terms fine and coarse are used to differentiate relative resolutions or accuracy of data, as are the terms precise and approximate. For example, relatively speaking, the accuracy of cellular network locationing may be more coarse than that of GPS locationing, which provides fine resolution and more precise data.

The systems and methods are useful in connection with a mobile device that receives one or more location based services (LBS) via at least one LBS application that is either resident on or accessible by the mobile device. Each LBS application provides one or more services (e.g., navigation, mapping, surveying, emergency services, location-specific data services, and the like) in part by using device-level resources to obtain location data via GPS or any other satellite navigation system.

According to one aspect, both precise locationing and continual locationing functionalities are available to the mobile device, but continually precise locationing or continually active device-level locationing is selectively used in a manner that conserves the resources of the mobile device. In so doing, the resources of a wireless communications network and of a positioning system may be more efficiently used as well. Selective utilization involves determining when, why, where and how often to utilize resource-intensive continual locationing functionality.

According to another aspect, selective utilization is controlled in the wireless network, by a locationing resource control (LRC) module that accesses wireless network capabilities to locate or track a mobile device and control the GPS functionality within the mobile device, in accordance with the existence of predefined conditions or triggering events.

In certain embodiments, the predefined conditions determine when coarse resolution locationing equipment should be activated, such as but not limited to, when device presence is detected along certain portions of a route, types of thoroughfares, until the next turn or required action is imminent, and within permissible deviations from a route. In this fashion, user, application or network defined conditions can dictate, for example, that turn-by-turn directions or precise locationing is not needed in the user's home city, in certain other areas of familiarity, when the mobile device is on an interstate and the next exit that must be taken is more than five miles away, or when the mobile device has deviated less than two miles from the route (e.g., to get fuel or food at an interstate exit along the route).

The predefined conditions can include any number and type of relevant variables and parameters, including but not limited to speed, acceleration, distance, estimated time of arrival at a particular location, density of points of interest (e.g., number of turns in a route, or search results found in a given area), time of day (e.g., to preserve network resources at peak usage times), roaming status, data intensity of the relevant application, data plan of the user, data usage at a particular time, network or satellite availability and signal strength, battery charge remaining, power source (i.e., whether running on battery power), temperature, weather, identity of the user, and any other data input that is relevant to determining the necessary or desired level of precision supplied for locationing.

The predefined conditions may be application specific, and in fact, can be created using the LBS application. That is, multiple LBS applications that require locationing may utilize location data at different levels of precision, even though the applications run on the same mobile device. Predefined conditions can also be specified at the network level, e.g., by the LRC module, and are applied as well in the order of a condition hierarchy, and subject to overrides from the mobile device. The predefined conditions specified at the application level or at the network level may be overridden by the user of the mobile device, in some embodiments.

In certain embodiments, the utilization of coarse locationing in accordance with the predefined conditions is supplemented with occasional verification by discrete instances of fine locationing. Returning to the examples listed above, for example, one or more additional parameters may provide limits to the amount of time that can pass without obtaining the more precise location of a user travelling on an interstate.

In certain embodiments, the mobile device sends information to the LRC module to define the location data requisition that is or that will be needed by the LBS application to provide the LBS service to the mobile device. For example, if the service is navigation, the LBS application calculates the route and communicates the route (including the transition points, estimated trip duration, roadways, and the like) to the LRC module in the wireless network. If the user has selected or created conditions that are applicable, the LBS application also communicates the conditions. If the mobile device has current precise data indicating its location, that location data is also communicated.

According to another aspect, once manually or automatically specified at the device or network level, and communicated to the LRC module, the predefined conditions are applied automatically at the network level by the LRC module. Certain embodiments of the LRC module use a wireless communications network paging protocol to control activation of locationing equipment in accordance with the predefined conditions. Optionally, the LRC module's network-level control can be overridden or bypassed manually at the device level.

The LRC module retrieves any network-generated conditions and applies all of the conditions to the location data requisition to determine when to intervene with the operation of locationing equipment on the mobile device. More specifically, until the location data requisition is fulfilled (e.g., by completing a trip) or terminated by the user (e.g., by cancelling a trip, discontinuing an LBS application session, closing the LBS application, creating a new location data requisition), the LRC module compares the actual location of the mobile device (as determined at the network level) to the location data requisition to determine whether any predefined conditions indicate that device-level locationing equipment should be activated or deactivated.

DETAILED DESCRIPTION

As required, detailed embodiments of exemplary systems and methods are provided herein. The disclosed embodiments are merely examples that may be embodied in various and alternative forms, and combinations thereof. As used herein, for example, exemplary, and similar terms refer expansively to embodiments that serve as an illustration, specimen, model or pattern. The figures are not necessarily to scale and some features may be exaggerated or minimized, such as to show details of particular components. In some instances, well known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

Figure 1:
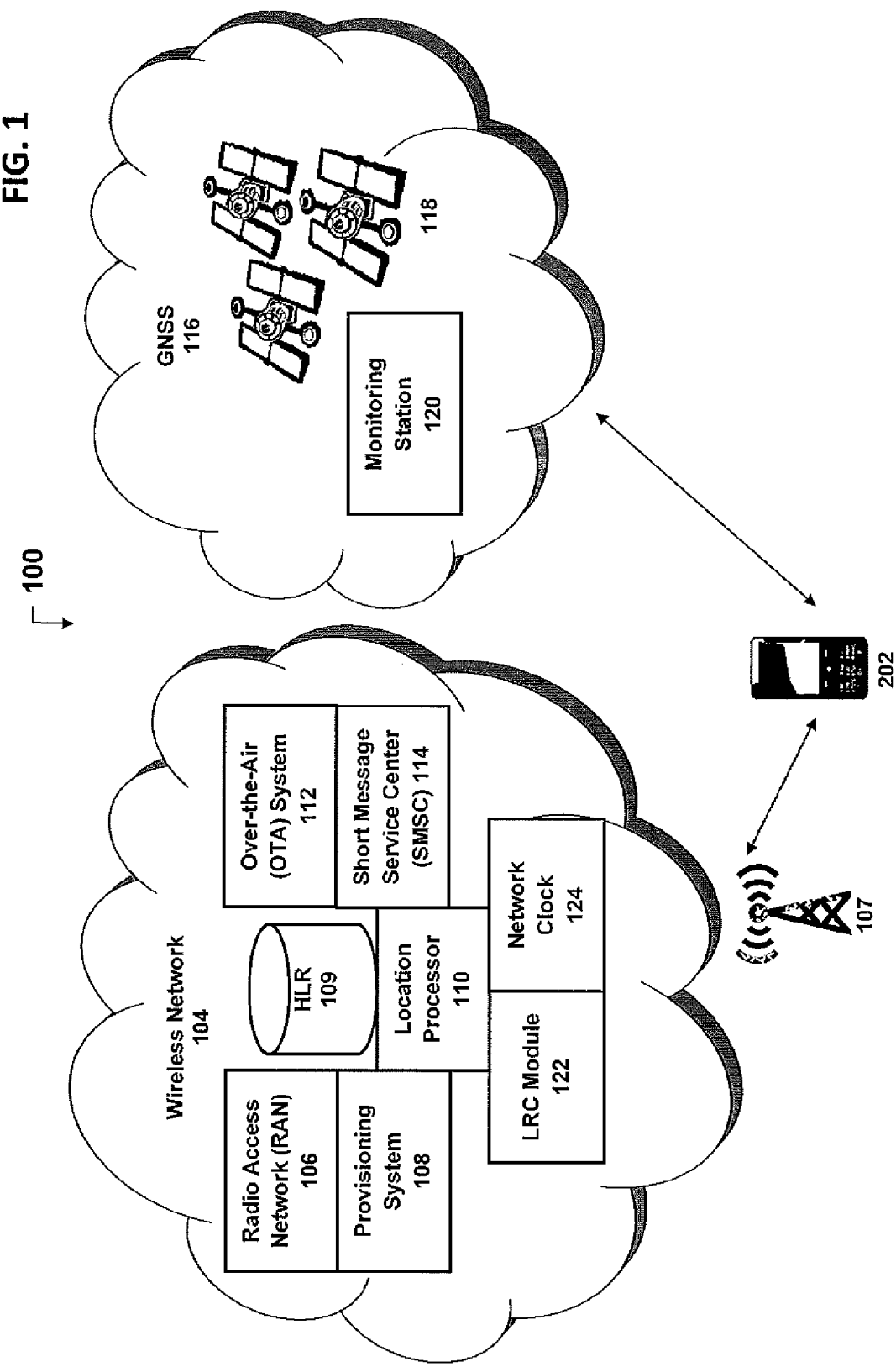
FIG. 1 illustrates an exemplary communications system.

The various systems, components and methods for network-assisted optimization of continual location determination that are described can be implemented in any suitable exemplary environment, such as the communications system 100 illustrated in FIG. 1. The communications network 100 of the embodiments described includes a mobile device 102, which is any suitable portable communication and processing device such as a cellular telephone, wireless messaging device, computer of any form factor (e.g., laptop, notebook, netbook, PDA, etc.), or the like.

The mobile device 102 operates with and in a wireless network 104. As described above, the wireless network 104 may operate according to GSM and UMTS standards or other suitable telecommunications technologies. The illustrated wireless network 104 is a GSM network, which includes a radio access network (RAN) 106. The RAN 106 includes at least one base transceiver station BTS 107, which are commonly referred to as cell towers. A BTS 107 provides the air/radio interface by which a mobile device communicates wirelessly with the wireless network 104. Each BTS 107 is in communication with a base station controller (BSC) (not shown). A BSC allocates radio resources to the mobile device 102, administers frequencies, and controls handovers between BTSs. A BSC communicates with a circuit-switched core network and packet-switched core network via a mobile switching center (MSC) and serving GPRS support node (SGSN), respectively. The BTSs, BSC, MSC, SGSN and other elements of the core networks are not illustrated so as not to distract from the various aspects of the present disclosure.

The wireless network 104 also includes a provisioning system 108, a location processor 110, an over-the-air (OTA) system 112, a short message service (SMS) center (SMSC) 114, and a home location register (HLR) 109. The functions of these network elements will be described in greater detail. It should be understood that, in some embodiments, functions described below as being performed by one network element may alternatively be performed by another network element. In one embodiment, the OTA system 112 and provisioning system 108 are combined. In other embodiments, the OTA system 112 and SMSC 114 are combined. Other combinations of the illustrated network elements that would be logical to improve performance, reduce costs, or facilitate easier maintenance are contemplated.

The mobile device 102 also operates with a global navigation satellite system (GNSS) 116, which in the exemplary embodiments is a GPS system that includes satellites 118 and at least one monitoring station 120. As will be described in further detail below, locationing for the mobile device is provided by the GNSS 116 and by the location processor 110, with selective activation of one or the other controlled in the wireless network 104 by a locationing resource control (LRC) module 122. The wireless network 104 also includes a network clock 124, which maintains system time for the wireless network 104.

Figure 2:
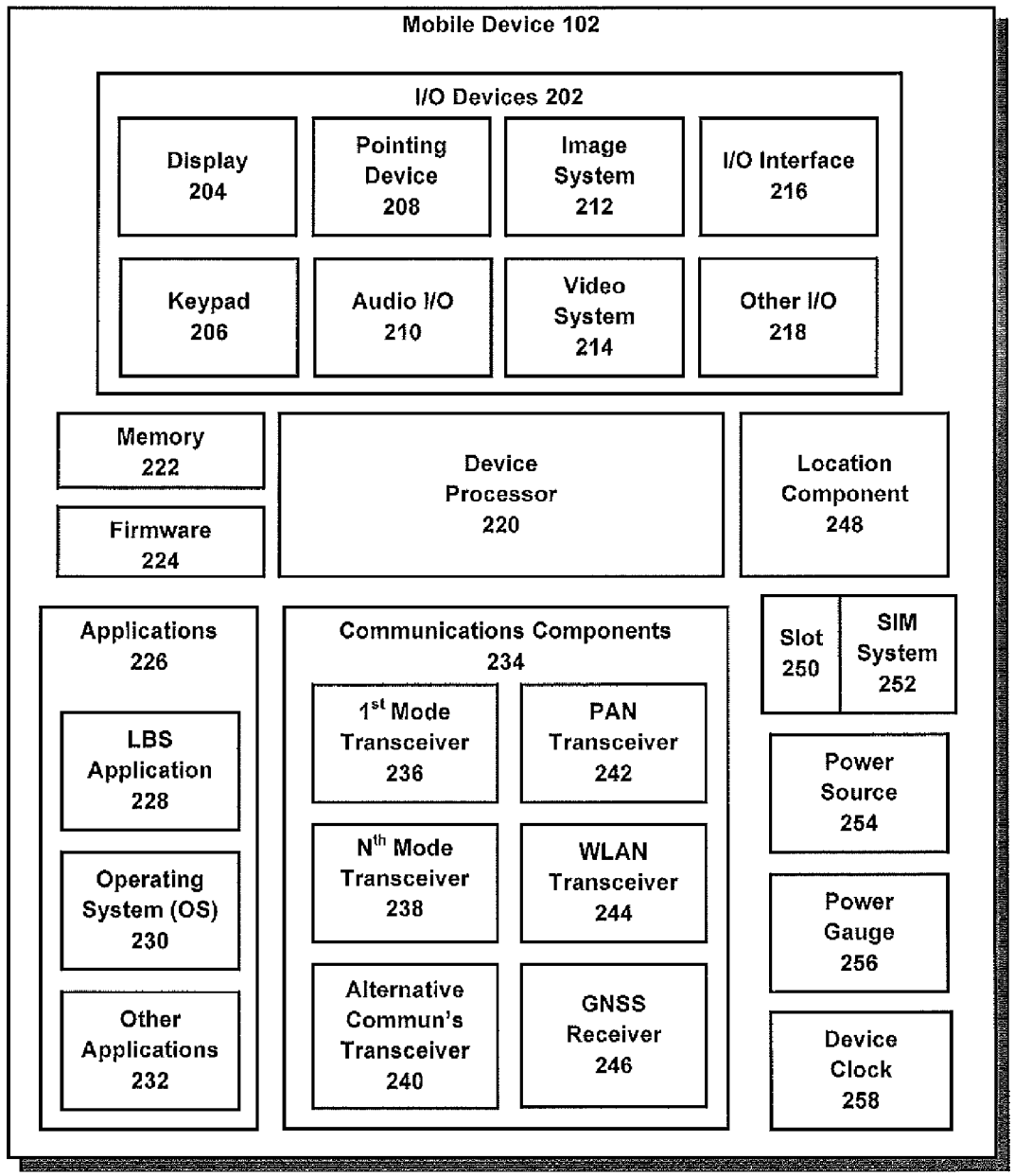
FIG. 2 is a schematic block diagram illustrating one possible configuration of an exemplary GPS-equipped mobile device 102.

FIG. 2 is a schematic block diagram illustrating one possible configuration of an exemplary GPS-equipped mobile device 102. Although connections are not shown between the components illustrated in FIG. 3, the components can interact with one another to carry out device functions. In some embodiments, for example, the components are arranged so as to communicate via one or more busses (not shown). It should be understood that FIG. 2 and the following description are intended to provide a general understanding of a suitable environment in which the various aspects of some embodiments of the present disclosure can be implemented.

As illustrated in FIG. 2, the mobile device 102 includes a number of input/output (I/O) devices 202, including a display 204 for conveying multimedia content such as application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The mobile device 102 includes other I/O devices such as, but not limited to keypad 206, pointing device 208 (e.g., mouse, interface tether, stylus pen, touch screen, multi-touch screen, touch pad, trackball, joystick), and audio I/O device 210 (e.g., microphone, speaker).

The illustrated mobile device 102 also includes an image capture and processing system 212 (image system). Photos may be obtained via an associated image capture subsystem of the image system 212 (e.g., a still camera). The illustrated mobile device 102 also includes a video system 214 (e.g., a video camera) for capturing, processing, recording, modifying, and/or transmitting video content. Those skilled in the art will appreciate that the I/O devices 202 may include device combinations (e.g., the image system 212 and the video system 214 may be the same system), and may include any other I/O devices 216 (e.g., remote control interfaces, printer interfaces, thumb drive interfaces, sensors, and the like). In some embodiments, these I/O devices 216 include components that sense or otherwise collect other data (e.g., orientation), or that generate other outputs or stimuli (e.g., vibration, warmth).

The illustrated mobile device 102 also includes an input/output (I/O) interface 218 for conveying data to and from the I/O devices 202. In some embodiments, the I/O interface 218 utilizes a hardwired connection, such as, for example, a USB, mini-USB, audio jack, PS2, IEEE 1394, serial, parallel, Ethernet (RJ48) port, RJ11 port, or the like.

The illustrated mobile device 102 also includes a device processor 220 for processing data and executing the executable instructions stored in memory 222 or firmware 224 in order to implement the functionality provided by a number of applications 226. The firmware 224 generally controls basic functions of the mobile device 102, such as its power-up and soft-reboot operations, and may but does not necessarily reside in read-only media.

In this configuration, the memory 222 of the mobile device 102 consists of any number, type and combination of a variety of computer readable media, including, for example, volatile media, non-volatile media, removable media, and non-removable media. The term computer-readable media and variants thereof, as used in the specification and claims, refer to storage media and communication media. Storage media may include volatile and/or non-volatile, removable, and/or non-removable physical components, such as, but not limited to random access memory (RAM), synchronous dynamic random access memory (SDRAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 102.

In some embodiments, the applications 226 include a LBS (location based service) application 228. The LBS application 228 can be downloaded to the mobile device 102 (e.g., via the provisioning system 108 and/or OTA system 112) or can be pre-installed or otherwise loaded (e.g., via the Internet using a link in a short message provided via the SMSC 114). The LBS application 228 interfaces with an operating system (OS) 230 to facilitate user control or awareness of interaction between either or both of the GNSS 116 and a location component, and with other device functionality and data. In some embodiments, the OS 230 is one of Symbian OS, Microsoft® Windows® Mobile OS, Palm® webOS™, Palm® OS, RIM® BlackBerry® OS, Apple® iPhone® OS, or Google Android™ OS. These operating systems are merely exemplary of the operating systems that may be used in accordance with the embodiments disclosed herein.

The various applications 226 facilitate any desirable or necessary function of the mobile device 102, for example, by enabling the user to enter message content, view received messages (which may be multimedia messages, SMS messages, voicemail messages, visual voicemail messages, and the like), manage messages, answer/initiate calls, enter/delete data, enter and set user IDs and passwords for device access, configure settings, manipulate address book content and/or settings, multimode interaction, interact with the LBS application 228 as well as other applications 232, and the like. In some embodiments, the other applications 232 include, for example, general graphical user interface (GUI) applications, visual voicemail applications, messaging applications (e.g., SMS, EMS, MMS applications), presence applications, textto-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like.

A communications component 234 interfaces with the processor 220 to facilitate communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the communications component 234 includes a multimode communications subsystem for providing cellular communications via different cellular technologies. In some embodiments, for example, a first cellular transceiver 236 operates in one mode, such as, GSM, and an Nth cellular transceiver 238 operates in a different mode, such as UMTS.

While only two cellular transceivers 236, 238 are illustrated, it should be appreciated that any number of cellular transceivers can be included, and that alternative communications transceivers 240 may be included as well for use with any other communications technologies such as, for example, WIMAX, infrared, infrared data association (IRDA), near field communications (NFC), radio frequency (RF), and the like. For instance, the illustrated embodiment includes a personal area network (PAN) transceiver 242 (using for example, the BLUETOOTH protocol), and a WLAN transceiver 244 for internet based radio services network communications (e.g., via WIFI hot spots).

The communications component 234 also facilitates reception digital satellite radio networks. In the illustrated embodiment, for example, the mobile device 102 includes a GNSS receiver 246 for receiving signals from GNSS satellites 118. In the exemplary embodiments, the GNSS 116 utilizes GPS, and optionally, assisted GPS (A-GPS) protocols.

The GNSS receiver 246 is part of or interfaces with a location component 248 for processing, sending and receiving signals for determining a location of the mobile device 102. The location component 248 also uses any or all of the communications components 234 to interface with cellular network based systems, including nodes, location transmitters and/or beacons, wireless network transmitters and receivers, combinations thereof, and the like. Using the location component 248, the mobile device 102 obtains, generates, and/or receives data to identify its location, or transmits data used by other devices to determine the location of the mobile device 102.

The location component 248 includes any type of location determination software, hardware or a combination of the two. The hardware portion of location component 248 incorporates, at least, a chip (not shown) for detecting locationing (e.g., GPS) signals. The precise specifications, location, and configuration of the chip are immaterial. The location component 248 may also comprise additional hardware, software, or a combination of the two (e.g., software embedded in an ASIC chip) necessary to integrate the chip with the operational architecture of the mobile device 102.

The location component 248 also includes or interfaces with any software, hardware or combinations thereof necessary to interface with the location processor 110 in the wireless network 104 for the purpose of enabling the wireless network 104 to determine and track the location of the mobile device 102.

The illustrated mobile device 102 also includes a slot interface 250 for accommodating a subscriber identity system 252 such as, for example, a subscriber identity module (SIM) card or universal SIM (USIM) card. Alternatively, the SIM system 252 may be manufactured into the device 102, thereby obviating the need for a slot interface 250. In some embodiments, the SIM system 252 is programmed by a manufacturer, a retailer, a user, a computer, a network operator, or the like. The SIM system 252 may be configured to store voicemail account information, such as voicemail passwords and pilot numbers.

The mobile device 102 also includes a power source 254, such as batteries and/or other power subsystem (AC or DC), which may include or interface with an external power system or charging equipment. A power gauge 256 indicates and tracks the battery charge, and a device clock 258. The device clock 258, which may be correlated to or driven by a GNSS (here, GPS) clock, maintains the device time, which is synchronized with the clock maintained by the wireless network 104.

Figure 3:
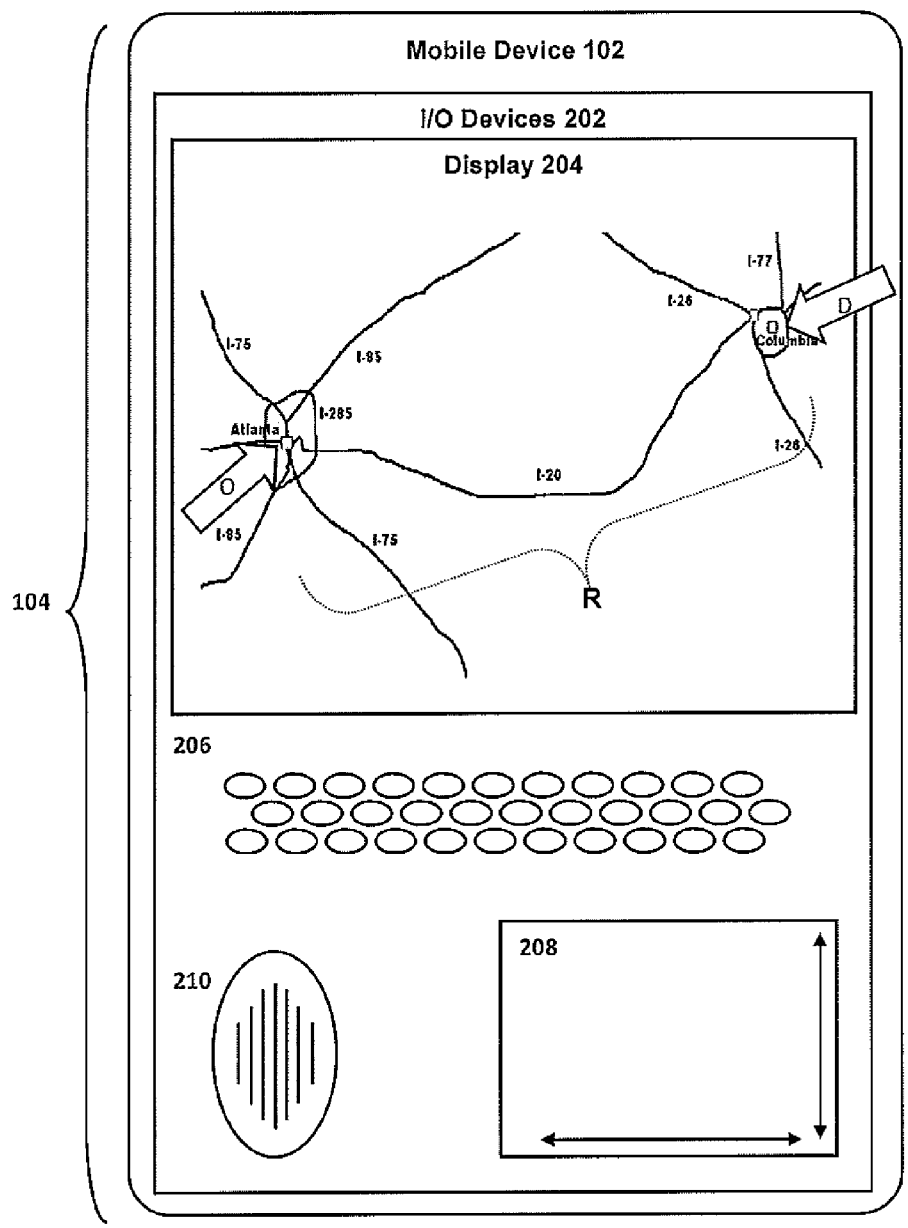
FIG. 3 is an illustration of exemplary user interface components of the mobile device of FIG. 2, showing a map view of a route.
Figure 4:
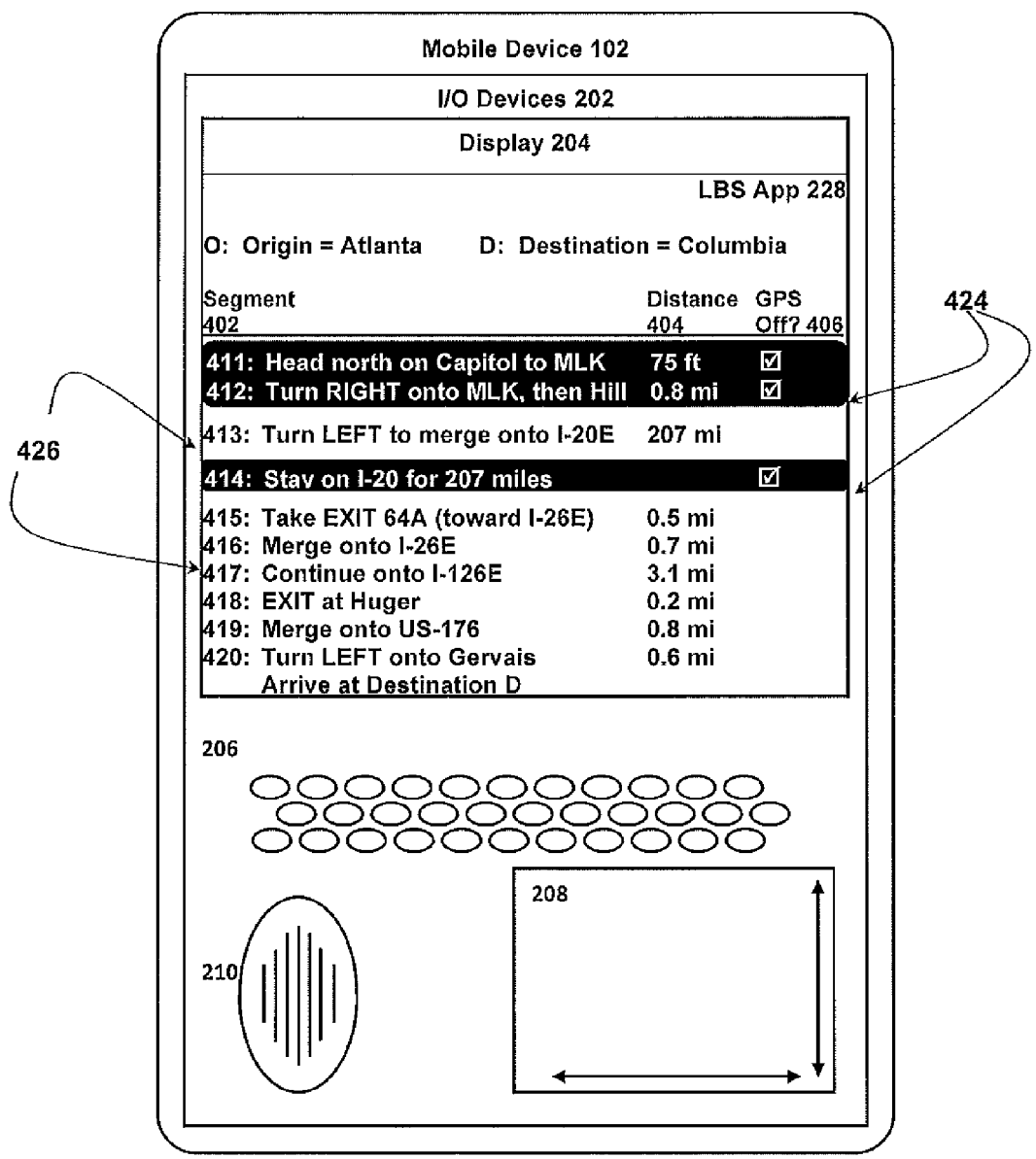
FIG. 4 is an illustration of exemplary user interface components of the mobile device of FIG. 2, showing a text view of a route.
Figure 5:
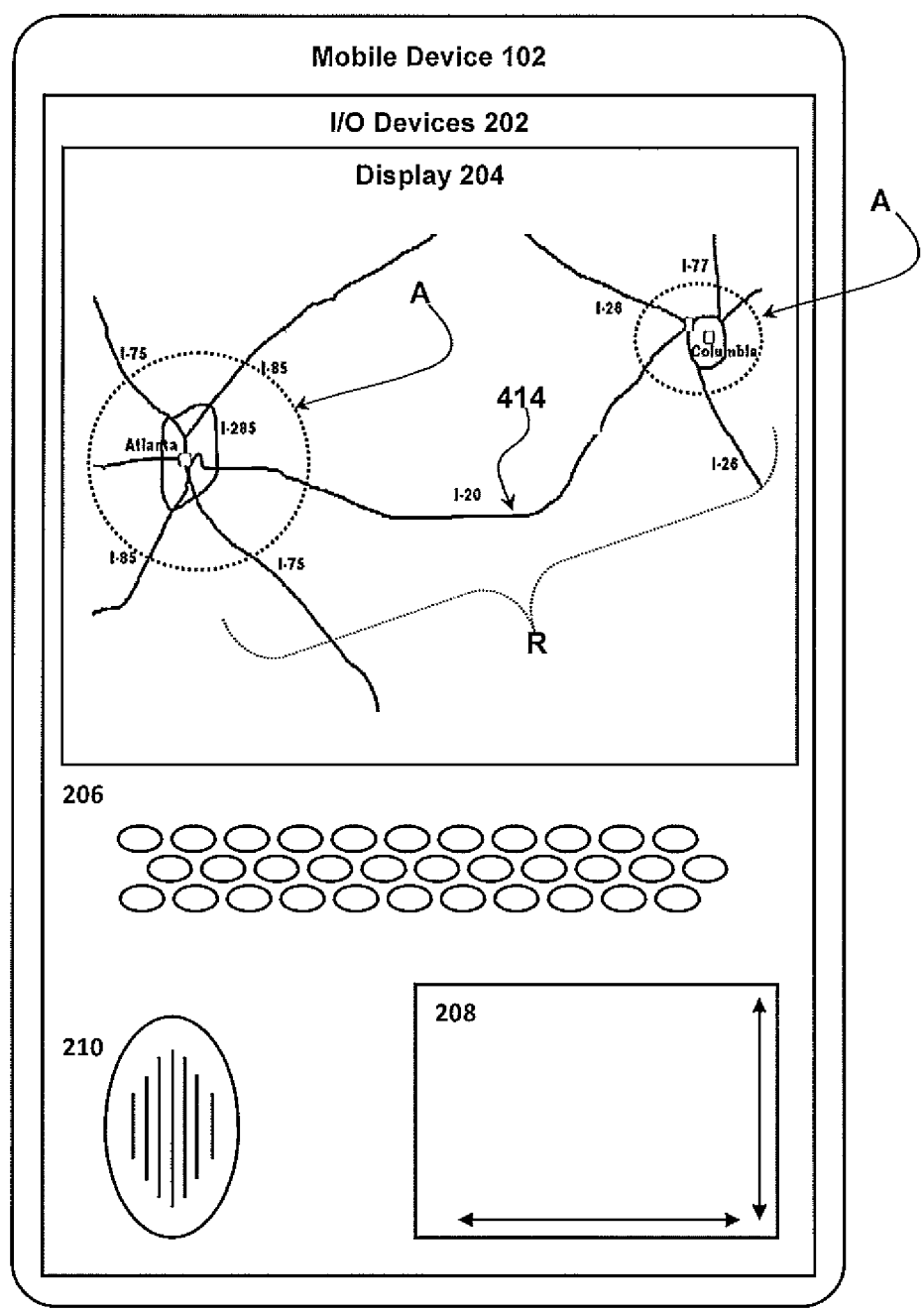
FIG. 5 is an illustration of exemplary user interface components of the mobile device of FIG. 2, showing a map view of a route with selected areas emphasized.

In the exemplary embodiment, the LBS application 228 is a GPS navigation system. FIGS. 3-5 illustrate a graphic user interface (GUI) based implementation of LBS application 228, which provides maps (FIGS. 3 and 5) and turn-by-turn directions (FIG. 4) to communicate a designated route to a user. The turn-by-turn directions include any desirable or necessary information, which may include such data as the present necessary direction of travel as well as the distance traveled and remaining in the route and in each segment of the route. In FIGS. 3-5, for example, the display 204 reflects the present position O of the user in addition to a desired destination D of the user.

A point of origin O and desired destination D can be supplied to the LBS application 228 through a variety of means. A user may manually enter the origin O and the destination D into the mobile device 102, for example, via the display 204 (if touchscreen enabled), keypad 206, audio I/O 210 (e.g., via voice recognition) in response to prompts generated by the LBS application 228 installed on the mobile device 102. Alternatively, the LBS application 228 may automatically detect the origin O or destination D as the current location of the mobile device 102 or allow the user to select from stored favorites or search results.

Alternatively, the origin O may be a reference point R used as the basis for a "search nearby" query that generates one or more potential destinations from which the user may choose. Such functionality is useful when the user has a particular type of destination in mind (e.g., a gas station), and wishes to identify practical and desirable options.

The particulars of the technologies involved in determining location via GNSS or cellular network based protocols, provision of location based services such as GPS navigation, or selection of conditions that may be desirable to limit the use of continual locationing will not be described exhaustively. Rather, emphasis is placed on modifications and distinctions that are relevant to describe and teach network-assisted optimization principles. To do so, such technologies are described broadly and reference is made to commonly-assigned U.S. Pat. No. 7,026,984, entitled "Intelligent Utilization of Resources in Mobile Devices," the entirety of which is hereby incorporated by such reference.

The exemplary LRC module 122 works with the location processor 110 in order to selectively utilize wireless network resources and GNSS resources, particularly, to save mobile device battery power and GNSS or wireless network bandwidth. The exemplary LRC module 122 is configured with conditional settings and also processes user-defined or application-specific conditions, all of which define when, why, and how the LRC module 122 will selectively deactivate certain GNSS based locationing functionality of the mobile device 102, such as by instructing the mobile device to disable the GNSS receiver 246.

Selection of Conditions

As mentioned above, network-assisted optimization involves applying conditions. Accordingly, means are provided for specifying conditions. In certain embodiments, the user specifies conditions reactively (e.g., in response to prompts when accessing the LBS application 228) or prospectively, for example, by setting preferences, rules, and preselecting trip-specific conditions via the LBS application 228. In certain of these and as well as other embodiments, conditions also may be specified automatically by the LBS application 228, e.g., in accordance with presets, defaults, experiential learning, artificial intelligence or in reaction to detecting limited availability of resources in the mobile device 102. Conditions may be specified in similar fashion by the LRC module 122 in the wireless network 104.

In the exemplary embodiment, and with reference to FIG. 3, the LBS application 228 generates a map 300 in response to a user's request to chart a route R between Atlanta, Ga. and Columbia, S.C. The map 300 shows the user's origin O and destination D, the suggested route R for traveling between the two, as well as the transitions T (i.e., turns, exits, landmarks and the like) that the user must make to stay on the route R.

If the display 204 of the mobile device 102 has touchscreen capabilities or has a convenient pointing device 208, the user can easily use these components to select conditions. That is, the user can identify an area A (FIG. 5) by touching, outlining or pointing to a discrete portion of the map, such as a point (e.g., the origin O or destination ID), a segment 402 (best shown as elements 411-420 in FIG. 4) along the route R, a subdivision, city, county or state name, or a roadway identifier. The boundaries of the area A can define a condition (e.g., "if within this area A . . . ") to which an action is prescribed (e.g., " . . . then deactivate GPS tracking and use network-based tracking instead"). The user can also identify the area using any other I/O device 202, including the keypad. The LBS application 225 may provide dialog boxes, pop-up flags, icons, menus, lists and the like to facilitate selection of areas A, condition alternatives, and action alternatives.

The LBS application 228 may generate a list 400 of turn-by-turn directions in addition to or as an alternative to the map 300. The term list is intended to include any sort of menu, roster, ledger, spreadsheet or other listing that is or can be ordered or sorted in any fashion. In the exemplary embodiment shown in FIG. 4, the list 400 includes a number of segments 411-420 ordered by occurrence along the route R. The distance 404 of travel along each segment is also provided. In FIG. 4, the user has selected segments 411, 412 and 414 as being areas A in which fine locationing is not required, so each selected segment 411, 412, 414 is highlighted and marked with the action 406 associated with the condition, which is "turn GPS off." It should be noted that multiple actions 406 may be available, and multiple combinations of actions 406 can be applied to any one segment. Moreover, a hybrid combination of actions 406 may include a manually selected action and a preset action. For example, the manually selected action "turn GPS off" may be supplemented with the user-defined or application-specified default action "unless average speed falls below 45 mph over a two minute interval" or "unless mobile device deviates from route by more than 2 miles" or "unless user override signal is received."

Those skilled in the art will recognize that modern mobile devices and device applications will yield numerous permutations of GUI and other application interfaces, means for selecting segments and areas, and I/O devices for inputting selection data. All such permutations are suitable for implementation of the principles described herein.

Communication of Conditions to LRC Module 122

Once device-side conditions are specified, the LBS application 228 communicates relevant locationing data to the LRC module 122, along with the applicable device-side conditions. Referring again to the exemplary embodiment, as an example, the LBS application 228 communicates all or necessary parts of the selected route R to the LRC module 122. The LRC module 122 processes the data associated with the route R and the device-side conditions, and the LRC module 122 determines whether and which network-side conditions are applicable.

Implementation of Conditions

The LRC module 122 then tracks the location of the mobile device 102 using network resources (such as by interrogating the HLR 109 associated with the mobile device 102) until the fulfillment of one of the conditions is detected. In other words, as the mobile device 102 travels along the route R, the wireless network 104 tracks the location of the mobile device 102 as it may typically does to ensure provision of voice services as the mobile device 102 is handed off from cell to cell. This coarse locationing provides enough data to determine whether the mobile device 102 is located within an area A that corresponds to a condition specified at the device or network level.

If a condition is fulfilled, the LRC module 122 signals the mobile device 102 to perform the desired action 406. In the exemplary embodiment, for example, the LRC module 122 signals the mobile device 102 via the OTA system 112, SMSC 114 or any other network paging or messaging system suitable for communicating instructions or triggers to cause the mobile device 102 to perform the desired action 406.

The LRC module 122 includes or has access to the resources, such as hardware, software, or combinations thereof, that is necessary for implementation of the various monitoring and signaling described. In addition, various algorithms are embodied in the LRC module 122 to make necessary calculations, such as speed of the mobile device 100 based on the provision of elapsed time and distance traveled as provided by various components of the mobile device 102 including, but not limited to, the GNSS receiver 246 and location component 248. Additionally, the LRC module 122 comprises the necessary hardware, software, and/or combination to integrate and interact with other necessary components of the wireless network 104 as well as being able to activate or, as is necessary, suppress the operation of GNSS receiver 246, for example to conserve resources (e.g., battery power and network bandwidth).

If a condition requires deactivation of the GNSS receiver 246, then the LRC module 122 communicates location updates to the location component 248. The location component 248 utilizes the location data received in location updates from the LRC module 122 in lieu of the location updates that would be provided via the GNSS receiver 246 were it not deactivated. The location component 248 passes the location data to the LBS application 228 for use in providing the location based service.

As the term is used herein, deactivation indicates discontinuing use of the subject device, but may or may not require disabling all of the functionality of the subject device. In some embodiments, for example, the GNSS receiver 246 is powered down for deactivation, while in others, the GNSS receiver 246 is deactivated by disabling its processing of received signals. In certain embodiments, deactivation or activation may also require state changes or other alteration of the functionality of other components that are necessary to, associated with, or that support the functionality of the GNSS receiver 246.

The above-described embodiments are exemplary. One skilled in the art will recognize and appreciate various applications of the disclosed invention beyond those presently described here. For example, the teachings of the present invention are applicable in any suitable global positioning system, whether known or yet to be developed, such as but not limited to Galileo, COMPASS, GLONASS, IRNSS, and QZSS. Accordingly, this disclosure is not meant to be limiting beyond those limitations as expressly provided in the claims.

The invention claimed is:

1. A system, for controlling locationing functionality of a mobile device within a wireless network, comprising:
   a processor; and
   a computer-readable storage medium having stored thereon computer-executable instructions that, when executed by the processor, cause the processor to perform operations comprising:
      obtaining conditions precedent to directing the mobile device to perform an action corresponding to the conditions, wherein the conditions relate to precision of locationing for the mobile device, wherein the conditions comprise a first condition, a second condition, and a third condition, and wherein obtaining the conditions includes obtaining the first condition generated by the mobile device, receiving the second condition from a location based services application operating on the mobile device, and receiving the third condition from a network resource within the wireless network;
      determining whether at least one of the conditions is met based on a location of the mobile device; and
      directing, in response to determining that the condition is met, the mobile device to perform the action corresponding to the condition met, wherein directing the mobile device to perform the action comprises:
         directing the mobile device to activate a global-navigation-satellite-system receiver of the mobile device when the condition met indicates a need for fine locationing of the mobile device; and
         directing the mobile device to deactivate the global-navigation-satellite-system receiver when the condition met indicates a need for coarse locationing of the mobile device.

2. The system of claim 1, wherein the operation of directing the mobile device to perform the action corresponding to the condition met comprises signaling the mobile device using an over-the-air system.

3. The system of claim 1, wherein the operation of directing the mobile device to perform the action corresponding to the condition met comprises sending a message via a short message service center to the mobile device.

4. The system of claim 1, wherein the operations further comprise querying a home location register associated with the mobile device to determine the location of the mobile device.

5. The system of claim 1, wherein determining whether at least one of the conditions is met includes applying a hierarchy to the conditions.

6. The system of claim 1, wherein the instructions further cause the processor to perform overriding the direction of the mobile device to perform the action if multiple conditions are met and the actions corresponding to the conditions met are different.

7. A method, performed in a wireless network, for controlling locationing functionality of a mobile device, comprising:
   obtaining, by a processor of the wireless network, conditions precedent to directing the mobile device to perform an action corresponding to the conditions, wherein the conditions relate to precision of locationing for the mobile device, wherein the conditions comprise a first condition, a second condition, and a third condition, and wherein obtaining the conditions includes obtaining the first condition generated by the mobile device, receiving the second condition from a location based services application operating on the mobile device, and receiving the third condition from a network resource within the wireless network;
   determining, by the processor, whether at least one of the conditions is met based on a location of the mobile device; and
   directing, by the processor, in response to determining that the condition is met, the mobile device to perform the action corresponding to the condition met, wherein directing the mobile device to perform the action comprises:
      directing the mobile device to activate a global-navigation-satellite-system receiver of the mobile device when the condition met indicates a need for fine locationing of the mobile device; and
      directing the mobile device to deactivate the global-navigation-satellite-system receiver when the condition met indicates a need for coarse locationing of the mobile device.

8. The method of claim 7, wherein directing, by the processor, the mobile device to perform the action corresponding to the condition met comprises paging, by the processor, the mobile device using an over-the-air system.

9. The method of claim 7, wherein directing, by the processor, the mobile device to perform the action corresponding to the condition met comprises sending, by the processor, a message via a short message service center to the mobile device.

10. The method of claim 7, further comprising querying, by the processor, a home location register associated with the mobile device to determine the location of the mobile device.

11. The method of claim 7, wherein determining whether at least one of the conditions is met includes applying a hierarchy to the conditions.

12. The method of claim 7, further comprising overriding the direction of the mobile device to perform the action if multiple conditions are met and the actions corresponding to the conditions met are different.

13. A tangible computer-readable storage device having stored thereon computer-executable instructions that, when executed by a processor, cause the processor to perform operations comprising:
   obtaining conditions precedent to directing a mobile device to perform a corresponding action, wherein the conditions relate to precision of locationing for the mobile device, wherein the conditions comprise a first condition, a second condition, and a third condition, and wherein obtaining the conditions includes obtaining the first condition generated by the mobile device, receiving the second condition from a location based services application operating on the mobile device, and receiving the third condition from a network resource within the wireless network;

determining whether at least one of the conditions is met based on a location of the mobile device; and directing, in response to determining that the condition is met, the mobile device to perform an action corresponding to the condition met, wherein the directing comprises:

directing the mobile device to activate a global-navigation-satellite-system receiver of the mobile device when the condition met indicates a need for fine locationing of the mobile device; and directing the mobile device to deactivate a global-navigation-satellite-system receiver of the mobile device when the condition met indicates a need for coarse locationing of the mobile device.

14. The tangible computer-readable storage device of claim 13, wherein the operation of directing the mobile device to perform the action corresponding to the condition met comprises signaling the mobile device using an over-the-air system.

15. The tangible computer-readable storage device of claim 13, wherein the operation of directing the mobile device to perform the action corresponding to the condition met comprises sending a message via a short message service center to the mobile device.

16. The tangible computer-readable storage device of claim 13, wherein the operations further comprise querying a home location register associated with the mobile device to determine the location of the mobile device.

17. The tangible computer-readable storage device of claim 13, wherein the operation of determining whether at least one of the conditions is met includes applying a hierarchy to the conditions.

18. The tangible computer-readable storage device of claim 13, wherein the operations further comprise performing overriding of the direction of the mobile device to perform the action if multiple conditions are met and the actions corresponding to the conditions met are different.

19. A mobile device comprising:
a processor; and
a memory having stored thereon a computer-executable location-based services application that, when executed by the processor, causes the processor to perform operations comprising:

generating location requisitions data;

condition obtaining conditions precedent to a corresponding action of the mobile device, wherein the conditions relate to precision of locationing for the mobile device, wherein the conditions comprises a first condition and a second condition, and wherein obtaining the conditions includes generating the first condition associated with the mobile device and obtaining the second condition from a location based services application operating on the mobile device;

transmitting the location requisitions data, the first condition, and the second condition to a component of a wireless network, wherein the conditions further comprise a third condition obtained by the component of the wireless network from a network resource within the wireless network, and wherein the component of the wireless network determines whether at least one of the conditions is met; and receiving, from the component of the wireless network, in response to transmitting the location requisitions data and the first and second conditions and in response to the component of the wireless network determining that at least one of the conditions is met based on a location of the mobile device, instructions to perform the action corresponding to the condition met, wherein directing the mobile device to perform the action comprises:

activating a global-navigation-satellite-system receiver of the mobile device when the condition met indicates a need for fine locationing of the mobile device; and deactivating the global-navigation-satellite-system receiver when the condition met indicates a need for fine locationing of the mobile device.

* * * * *